United States Patent [19]
Beck

[11] Patent Number: 5,799,608
[45] Date of Patent: Sep. 1, 1998

[54] AUTOMATIC FEEDING APPARATUS, PARTICULARLY FOR AN AQUARIUM

[75] Inventor: Bernhard Beck, Esslingen, Germany

[73] Assignee: Eheim GmbH & Co. KG., Deizisau, Germany

[21] Appl. No.: 531,251

[22] Filed: Sep. 20, 1995

[30] Foreign Application Priority Data

Nov. 24, 1994 [DE] Germany .................. 44 41 809.4

[51] Int. Cl.⁶ .................................................. A01K 61/02
[52] U.S. Cl. .................................. 119/51.04; 222/167
[58] Field of Search ......................... 119/51.04, 51.11, 119/56.1, 57.92; 222/161, 167, 196, 650

[56] References Cited

U.S. PATENT DOCUMENTS

| | | | |
|---|---|---|---|
| 2,246,497 | 6/1941 | Beck | 222/161 |
| 2,678,238 | 5/1954 | Schutz | 222/167 X |
| 2,785,831 | 3/1957 | Smolin | 119/51.04 X |
| 3,043,479 | 7/1962 | Gaukstern | 222/650 X |
| 5,150,666 | 9/1992 | Momont et al. | 119/51.04 X |

FOREIGN PATENT DOCUMENTS

| | | | |
|---|---|---|---|
| 651942 | 11/1962 | Canada | 222/167 |
| 8529887 | 10/1985 | Germany | |
| 2240020 | 7/1991 | United Kingdom | 119/51.04 |
| 2264618 | 11/1993 | United Kingdom | 222/650 |

*Primary Examiner*—Robert P. Swiatek
*Assistant Examiner*—Elizabeth Shaw
*Attorney, Agent, or Firm*—Michael J. Striker

[57] ABSTRACT

An automatic feeding apparatus for an aquarium has a housing, a supply drum rotatably supported in the housing and provided with a food discharge opening, a drive device arranged in the housing for driving the supply drum. The housing has an opening which is spaced from the food discharge opening and through which outer air is supplied. The drive device has a blower and operates so that the outer air is supplied into an interior of the housing and then into the supply drum and through the supply drum to the food discharge opening so that when the blower is immovable moist air rising in a region of the supply drum near the food discharge opening produces an underpressure in a region of the food discharge opening so that the outer air is aspirated into the housing, through the supply drum and out the food discharge opening, while when the impeller is actuated outer air is blown by an inner overpressure produced by the blower in the same direction through the supply drum out of the food discharge opening to operate as a blocking air stream.

32 Claims, 4 Drawing Sheets

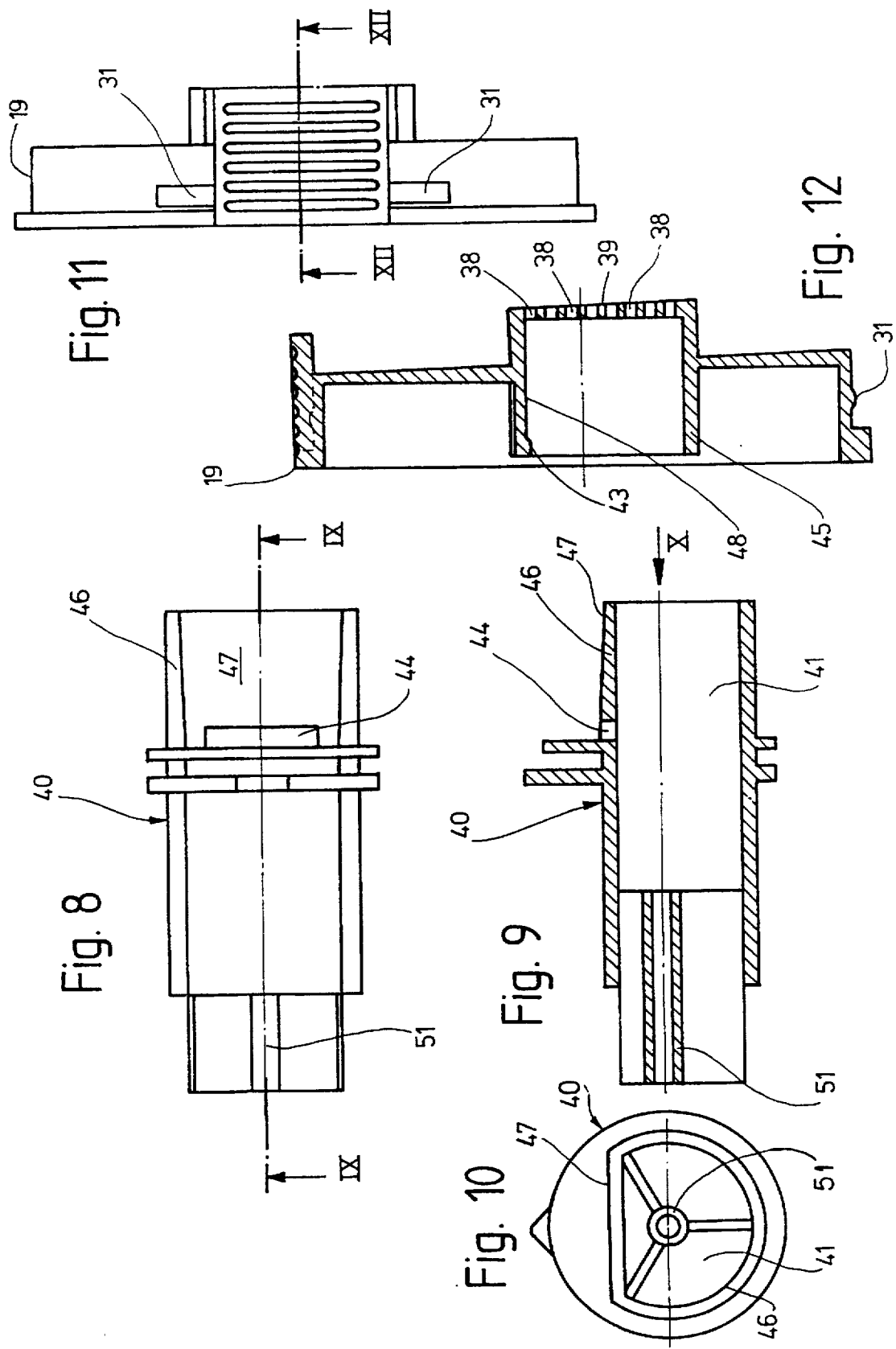

AUTOMATIC FEEDING APPARATUS, PARTICULARLY FOR AN AQUARIUM

BACKGROUND OF THE INVENTION

The present invention relates to an automatic feeding apparatus, particularly for an aquarium.

Automatic feeding apparatuses for aquariums are known, and usually such a feeding apparatus is located under the aquarium. There is however the danger that the moist air which rises from the aquarium can flow through openings of the supply drum located in the discharge region, and in particular through the food discharge opening, into the interior of the supply drum. Thereby the food can become moist and form lumps. This damages the food and has the disadvantage that an accurate dosing is no longer possible.

An attempt to eliminate the above mentioned disadvantages is proposed in an automatic feeding apparatus disclosed in the German document DE-GM 85 29 887. In this apparatus an air chamber provided with a nozzle is located in the housing under the supply drum, and a separate aeration device is connectable air the air chamber. The nozzle is located at a distance under the food discharge opening and is inclined upwardly before the food discharge opening. The auxiliary exterior aerating device continuously supplies air from outside into the air chamber and from there through the nozzle, from which the air is blown against the cup part provided with the food discharge opening and before the food discharge opening. Therefore the rising moist air cannot reach the food discharge opening. An air curtain is produced in this way before the food discharge opening and prevents penetration of moist air in the supply drum. In this feeding apparatus the housing is expensive and voluminous because of the air chamber with the nozzle and the connection for the additional aerating device. In addition, a separate aerating device is needed as an additional element connected through a suitable conduit, for example a hose, to the air chamber of the housing. The conduit is cumbersome. Since the air cushion is rotated at a distance under the food discharge opening, there is a tendency to take up the moist air. Therefore, penetration of the moist air in the food discharge opening is not completely prevented. If the volume stream or the pressure of the air in the air chamber is increased to avoid this disadvantage, undesirable noise formation is generated. Finally, the permanent air cushion in the feeding position can be hinder the fall of the food.

SUMMARY OF THE INVENTION

Accordingly, it is an object of the present invention to provide an automatic feeding apparatus of the above mentioned type, which avoids the disadvantages of the prior art.

More particularly, it is an object of the present invention to provide a feeding apparatus in which the food is reliably protected from moisture and which has a simple, compact construction without additional exterior operational elements to be connected by conduits.

In keeping with these objects and with others which will become apparent hereinafter, one feature of the present invention resides, briefly stated, in an automatic feeding apparatus, in particular for an aquarium, having a supply drum provided with a food discharge opening and rotatable in a housing, and a driving device located in the housing for the supply drum, with an opening located at the side of the housing and far from the food discharge opening for supplying an outer air, wherein in accordance with the present invention the driving device has an blower supplying the outer air into the interior of the housing and from there into the supply drum and through it to the food discharge opening so that when the blower is immovable the rising moist air in the region of the supply drum, in particular the food discharge opening, can produce an overpressure in the region of the food discharge opening and thereby to aspirate the outer air into the housing, through the supply drum and out of the food discharge opening, and when the blower operates an inner overpressure is produced by the blower and the outer air is supplied in the same direction through the supply drum and blown as a blocking air stream from the food discharge opening.

When the feeding apparatus is designed in accordance with the present invention, it provides the following advantages. In the immovable position (food blocking position) of the supply drum its food discharge opening deviates from the feeding position, as a rule upwardly. In this position the moist air rising from the aquarium is utilized for aspirating dry air from the food discharge opening farther with at least one opening in the housing through the housing and the supply drum. The food therefore does not come into contact with the moist air during the movable position of the supply drum. No moisture can accumulate there. During the rotation of the supply drum to its food releasing position in which the food throwing downwardly toward the aquarium is possible and the food discharge opening therefore is located downwardly, the penetration of moist air into the food discharge opening is prevented by a blocking air stream exiting the food discharge opening. This blocking air stream produced by the blower takes the same rate through the housing and the supply drum.

Advantageously, the exiting working air volume stream is maintained so low that it however has the entrained action but does not lead to whirling of the food in the supply drum. The dry air both in the immovable position as well as during the rotation of the supply drum is room air located far from the region in which the food discharge opening is located. During placing of the automatic food apparatus it is naturally necessary to take care that the food discharge opening is far from a housing opening for aspiration of the room air and is not located in a moist air stream. Therefore, in the feeding apparatus in accordance with the present invention, the food located in the supply drum is protected from moisture both in the immovable position of the supply drum as well as during its rotation. This objective is achieved with simple means and without a separate exterior aerating device.

In accordance with a further feature of the present invention, during the immovable position of the blower the supply drum also is immovable. During the immovable position of the blower and the supply drum, the food discharge opening deviates to the downwardly located feeding point, and in particular is located above. When the blower operates, the supply drum is rotated by the drive device with its food discharge opening between a food blocking position and a food releasing position. The supply is rotatable so as to be located in intervals between a food blocking position in which the food discharge opening is located above, and a food releasing position in which the food discharge opening is located below the feeding point.

The blower can be actuatable by the drive device together with the supply drum. The blower can be provided with a impeller, in particular a radial impeller which is driven by an electric drive motor of the drive device. Furthermore, an opening can be arranged at the side of the housing and far from the food discharge opening in the region of the blower, in particular the impeller of the blower.

A further inventive solution deals with the following situation. In known feeding apparatuses, the interior of the supply drum is closed with a cover at a point where the discharge of the food is performed and moist air acts. Since this end is subjected to the action of the moist air stream, there is the danger of condensation at the separating point between the cover and the supply drum. Under the capillary action of the gap between the cover and the supply drum, the condensate can penetrate into the interior of the supply drum and damage the food. In view of this, in accordance with the present invention the supply drum in the region of the food discharge is maintained closed (with the exception of the food discharge opening) and the separating point between the supply drum and the cover is displaced to the other end of the supply drum where no moist air acts.

In this construction the supply drum is formed as a substantially lying bucket with an open end extending far from the end which contains the food discharge opening, and because of the inclines required for removal from the mold during the manufacture of the supply drum as a synthetic plastic part, the supply drum also has the conicity of the supply walls toward the food discharge opening. In other words, the side walls rise in direction toward the food discharge opening. Such a course counteracts a movement of the food in direction toward the food discharge opening and does not allow a complete emptying of the supply drum. In order to maintain the above mentioned advantages and at the same time to provide a complete emptying of the supply drum, the feeding apparatus is designed so that the rotary axis for the drive of the supply drum is at least insignificantly inclined relative to the axis of the supply drum. Because of the inclination of the rotary axis to the axis of the supply drum, a forward inclination of the supply drum in the moment of the food ejection is provided. The food thereby is moved toward the food discharge opening. In contrast, in the movable position in which the food discharge opening is located above, the supply drum again assumes its horizontal initial position. The supply drum wobbles during a revolution. Because of this wobbling movement, a forward transportation of the food is provided. When the supply drum reaches the food ejecting position, the downwardly located side wall has an inclination in direction toward the food discharge opening.

The inclination angle of the rotary axis can amount to substantially 2°. The supply drum, starting from a horizontal course in the immovable food blocking position, moves during its rotary actuation for example over substantially 100° peripheral angle to the food releasing position to perform a wobbling movement so that a forward inclination which moves the food toward the food discharge opening is obtained.

In accordance with a further feature of the present invention the supply drum can be formed as a substantially lying bucket with closed bottoms and with a side wall which is closed up to the food discharge opening located in the side wall near the bottom, and open side of the bucket is closed by a releasable cover, and a supply drum with the cover faces the housing so as to be supported and driven in this region.

The removable cover is located as far as possible from the moist air stream. In the region of action of the moist air it provides no separating joint with respect to the supply drum, and therefore no food damaging condensate can be formed. The supply drum together with the cover can be removed fast and simple without specific expert skills, special tools and the like, for example after filling of the food.

The supply drum can be arranged on a hollow shaft, and a snap connection can be provided between the cover and the hollow shaft. The snap connection can be formed for example so that during pulling of the supply drum the supply drum together with the cover is released from the hollow shaft and thereby from the drive connection. In this way the supply drum together with the cover can be removed so that there is no danger that the food falls out and contaminates the environment. For filling the food, the cover is removed from the supply drum by pulling with overcoming of the snap connection. Thereby a simple handling for example for filling of the supply drum with food is provided in a simple, inexpensive and space consuming way.

It is to be understood that selectively for each feeding time for example a double revolution of the supply drum can be performed when desired. The second revolution can be delayed in a fixed time interval after the first revolution. For example for free programmable feeding time points can be provided per day.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 8 is a schematic plan view of a hollow shaft of the feeding apparatus in accordance with the present invention;

FIG. 9 is a view schematically showing a section along the line IX—IX in FIG. 8;

FIG. 10 is a view showing an end side as seen in direction of the arrow X in FIG. 9;

FIG. 11 is a schematic plan view of a cover of a supply drum of the inventive feeding apparatus;

FIG. 12 is a view schematically showing a section taken along the line XII—XII in FIG. 11.

DESCRIPTION OF THE PREFERRED EMBODIMENTS

Figure 1:
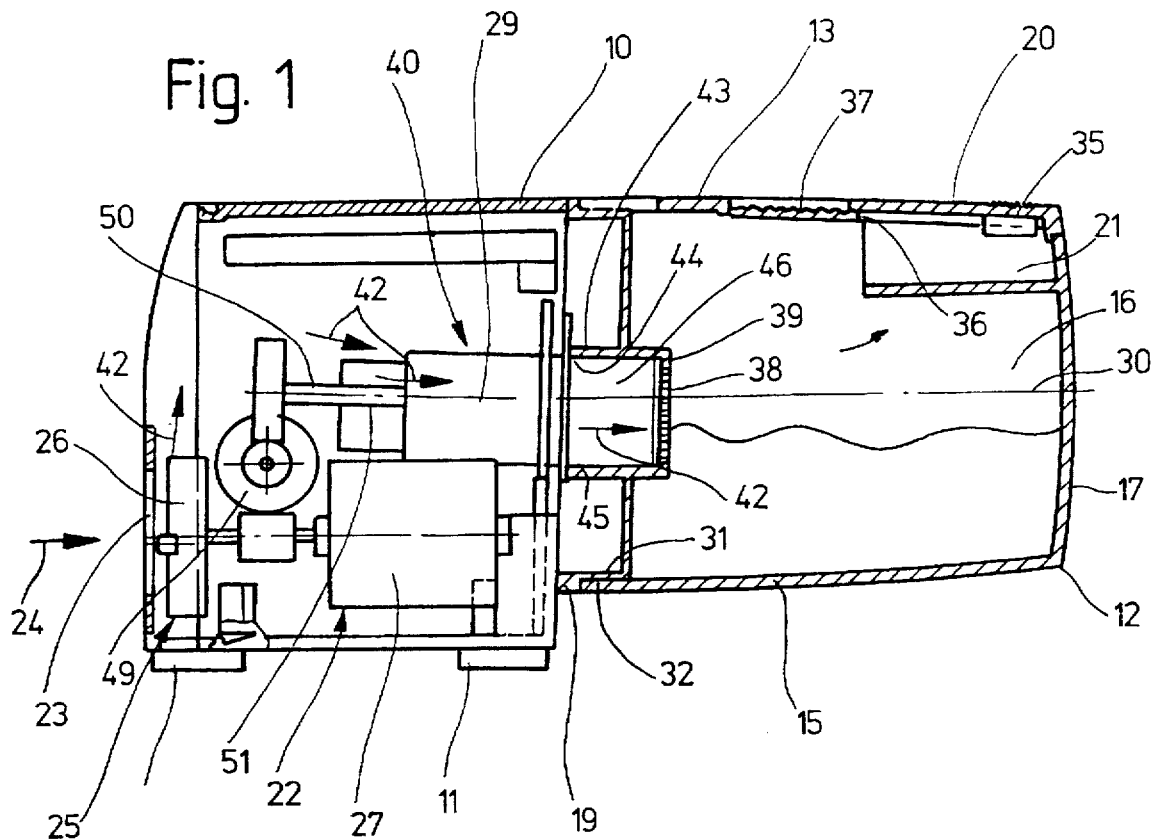
FIG. 1 is a view schematically showing a vertical section with a partial side section of a feeding apparatus in accordance with the present invention.

A feeding apparatus for an aquarium which can operate independently from an electrical network for example from a battery and provides a proportional discharge of particulate food is shown in the drawings.

The feeding apparatus according to the present invention has a housing which is identified with reference numeral 10 and provides with legs 11. The housing 10 can be placed on a surface, for example a cover of an aquarium. The housing 10 is for example approximately cubic and has partially curved side walls. It is composed for example of a synthetic plastic material.

Figure 5:
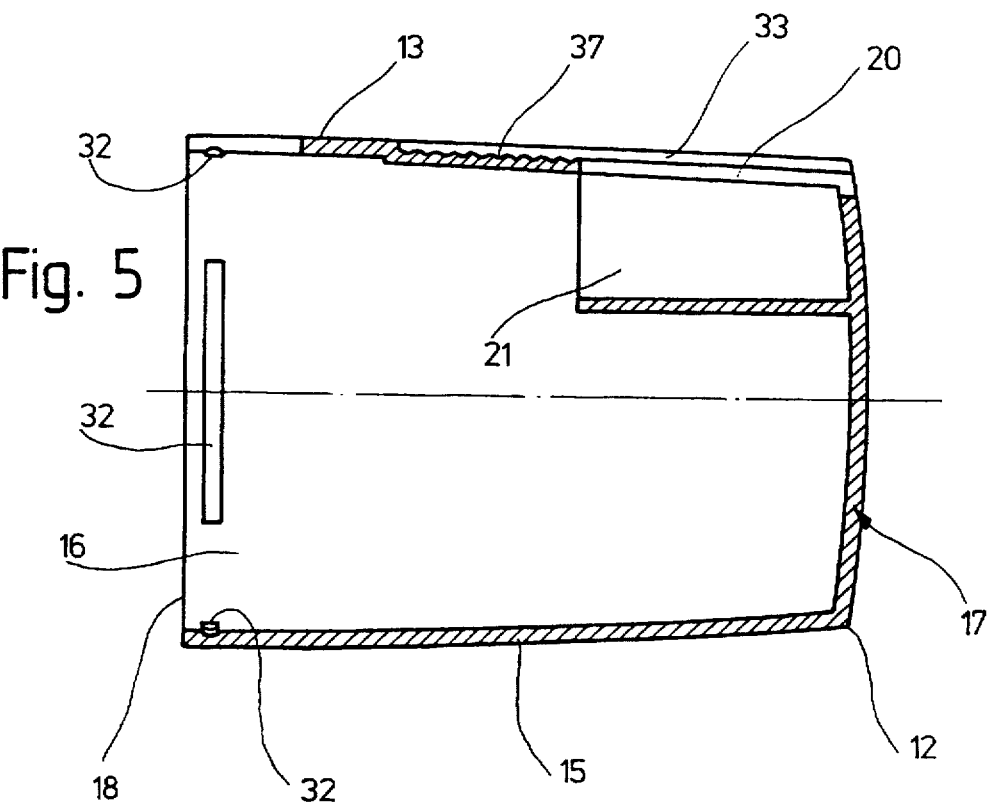
FIG. 5 is a view schematically showing a section along the line V—V in FIG. 4.
Figure 6:
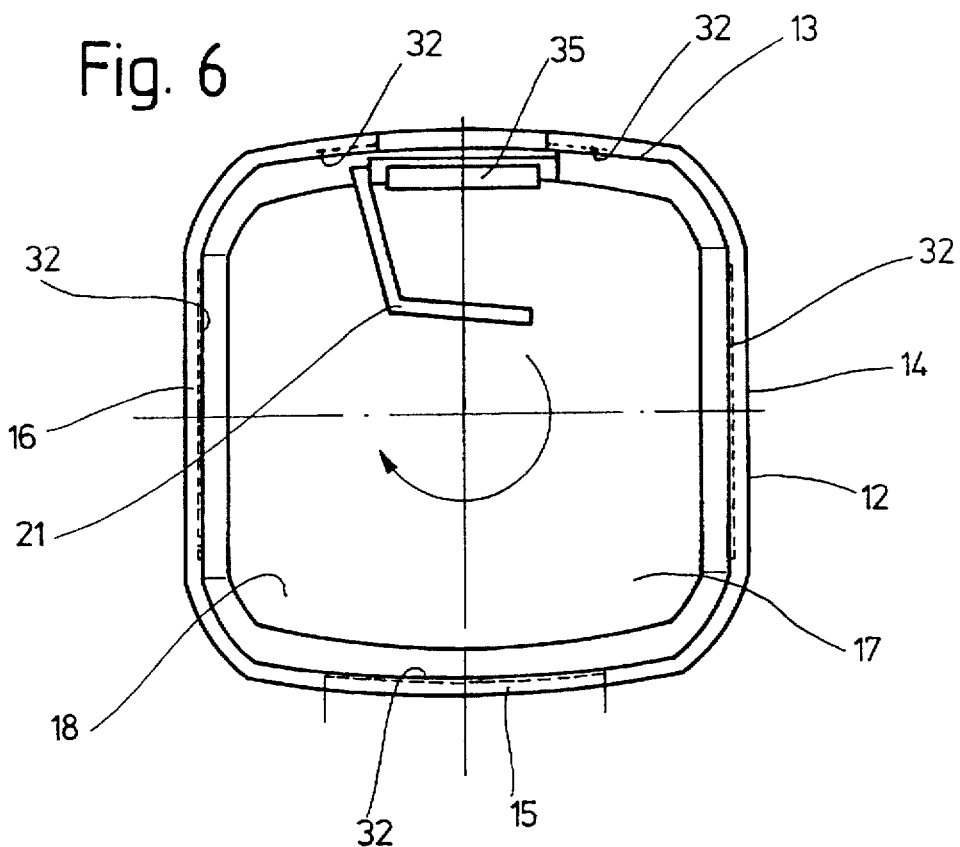
FIGS. 6 and 7 are views each showing schematically an end side as seen in direction of the arrows VI and VII in FIG. 4.
Figure 7:
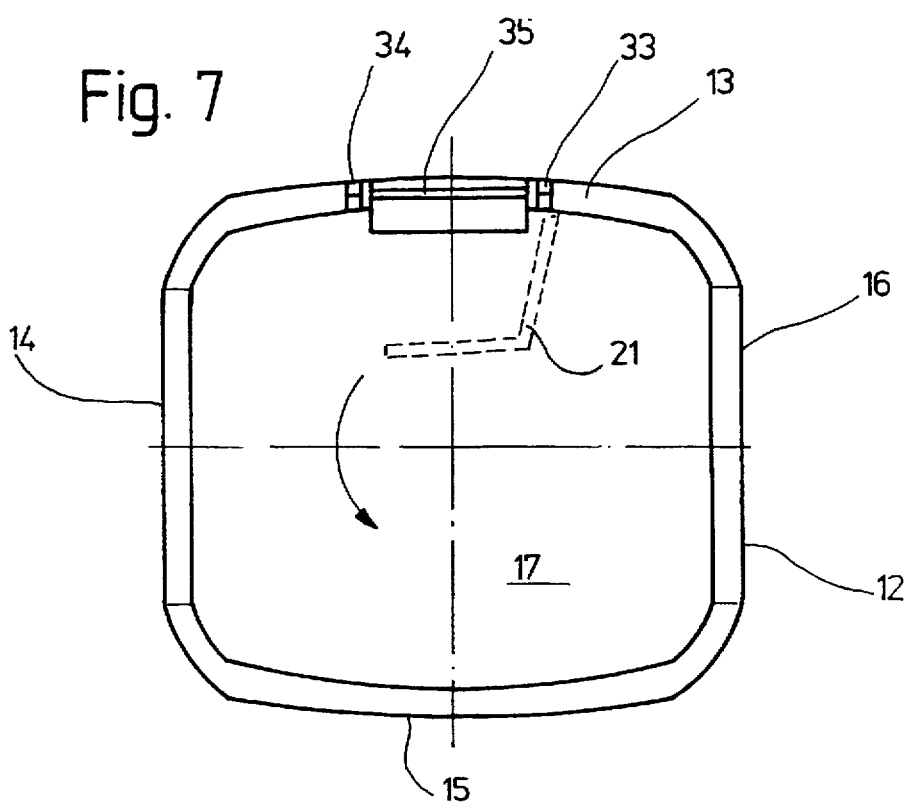

The feeding apparatus further has a supply drum 12 composed of for example of a synthetic plastic material and having a substantially square cross-section with rounded corners and at least slightly curved side walls 13, 14, 15, 16 as shown in FIGS. 6, 7. The supply drum 12 is formed as a substantially lying bucket with a closed bottom 17 and with closed side walls 13–16 and with an open end side 18 which is closeable by a releasable cover 19. The cover 19 faces the housing 10 and is in this region supported and driven. In this manner, the supply drum 12 is rotatably held on the housing 10. The side walls 14–16 of the supply drum 12 are closed, while the side wall 13 which is located above in FIGS. 1 and 5 is provided with a food discharge opening 20. The food discharge opening is overlapped by a substantially angular vane 21 located in the interior of the supply drum 12 and spaced from the opening. The food discharge opening 20 extends in the side wall 13 to the bottom 17.

A drive device 22 for driving the supply drum 12 is located in the housing 10. Generally, outer air is supplied in direction of the arrow 24 through at least one opening 23 which is located at the side of the housing remote from the food discharge opening 20.

The drive device 22 has a driven blower 25 with an impeller 26, in particular a radial impeller, which is driven by an electric drive motor 27 of the drive device 22.

The feeding apparatus in accordance with the present invention is arranged so that the outer air is supplied in accordance with the arrow 25 shown in FIG. 1 into the interior of the housing 10 an from there into the interior of the supply drum 12 and then through the supply drum to the food discharge opening 20. When the blower 25 is immovable, moist air which rises from below in the region of the supply drum 12, in particular the food discharge opening 20, can produce an underpressure in the region of the upwardly located food discharge opening 20 and thereby outer air is aspirated in accordance with the arrow 24 into the housing 10 through the supply drum 12 and out of the food discharge opening 20. Therefore, in the movable condition of the supply drum 12, the food contained in the supply drum is protected from moisture. The moist air which rises in the region of the food discharge opening 20 aspirates the surrounding air in this immovable condition in direction of the arrow 24 through the housing 10 into the interior of the supply drum 12, so that no moisture can accumulate there.

Figure 3:
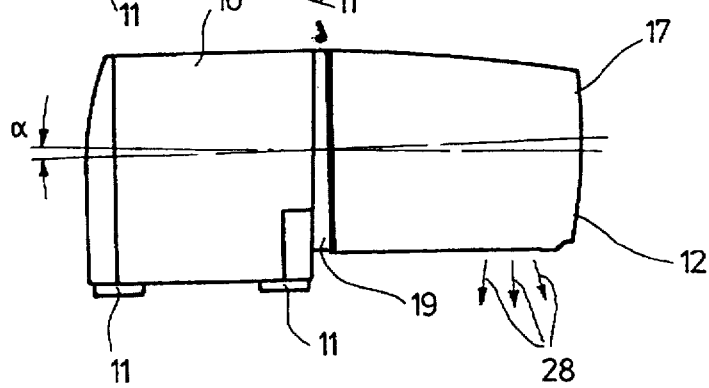

The feeding apparatus is further designed so that when the blower 25 is actuated, outer air is blown by an inner overpressure produced by the blower 25 in direction of the arrow 24 in the same direction through the supply drum 12 and as a blocking air stream out of the food discharge opening 20, as identified in FIG. 3 with the arrow 28. The blocking air stream 28 discharging from the food discharge opening 20 prevents penetration of moist air into the food discharge opening located below when the blower 25 is turned on. When the blower 25 propagates from the interior of the housing 10 through the supply drum 12 to the food discharge opening 20. The produced blocking air volume stream is preferably maintained so low that it exercises only a displacing action.

When the blower 25 is immovable, the supply drum 12 does not move as well. In this condition the food discharge opening 20 faces away from the downwardly located feeding point, and in particular it is located above as shown in FIG. 1. During the actuated blower 25, the supply drum 12 is rotatable by the drive device 22 with its food discharge opening 20 between the food blocking position when the food discharge opening is located above and the food releasing position when the food discharge opening is located below. The supply drum 12 is rotated therefore in intervals between the food blocking position and the food releasing position, and the blower 25 together with the supply drum 12 is actuatable by the drive device 22.

At least one opening 23 located at the housing side for supplying the outer air in direction of the arrow 24 is far from the food discharge opening 20 and in particular it is provided at the opposite end. This at least one opening 23 is located in the region of the dry surrounding air. The opening 23 is arranged in the region of the blower 25, in particular the impeller 26 so as to cause as little losses as possible.

Figure 2:
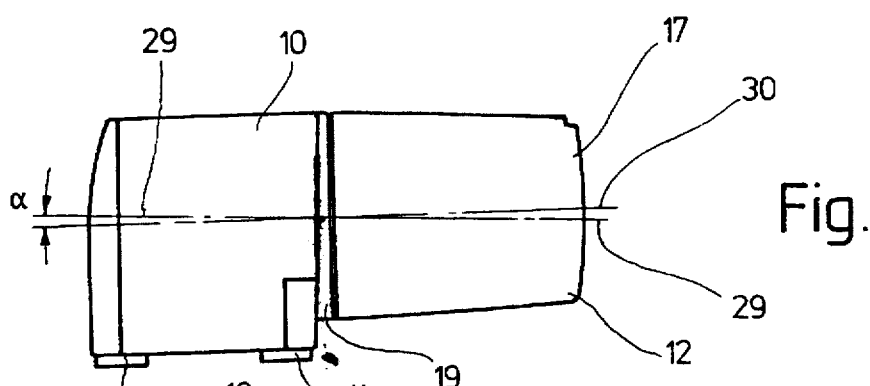
FIGS. 2 and 3 are views each showing schematically a side view of the feeding apparatus of FIG. 1 in a food blocking position with an upwardly located food discharge opening and in a food releasing position with a downwardly located food discharge opening.

A further important feature of the automatic feeding apparatus in accordance with the present invention is that the rotary axis 29 for the drive of the supply drum 12 extends so that it is at least insignificantly inclined relative to the axis 30 of the supply drum 12 by an angle α. The inclination angle α of the rotary axis 29 can amount for example to 2°. The supply drum 12, starting from a horizontal course shown in FIG. 2 which it has in the immovably food blocking position when the discharge opening 20 is located above, is rotatable during the rotary actuation for example over substantially 180° into the food releasing position shown in FIG. 3 in form of a wobbling movement. The wobbling movement provides a forward inclination of the food in FIGS. 2, 3 from the left to the right in direction toward the food discharge opening 20. Because of the inclination of the rotary axis 29 to the axis 30 of the supply drum 12, in the moment of food ejection a forward inclination of the supply drum 12 is obtained and the food is moved to the food discharge opening 20. In the immovable position which is opposite by 180° as shown in FIG. 2, the supply drum 12 is again located in the horizontal initial position. The supply drum 12 therefore performs, starting from the food blocking position shown in FIG. 2, a wobbling movement during the rotary movement to the food releasing position shown in FIG. 3. Thereby, in a simple manner a light conicity of the side walls 13–16 in FIG. 1 from the left to the right is compensated, which conicity is needed for removal from the mold during the manufacture.

It can be seen that the supply drum 12 is completely closed at the end which faces away from the housing 10 and at which the food discharge opening 20 is located. Therefore no separating points between the supply drum and the cover are available, since the supply drum 12 is also completely closed in the region of the bottom 17 being formed as a one-piece structure, with the exception of the food discharge opening 20. Thereby during action of moist air in this region no condensate is produced, which otherwise can penetrate under capillary action through an available gap between the supply drum 12 and the cover into the interior of the supply drum 12 and damage the food.

Instead, the separating point between the cover 19 and the supply drum 12 in FIG. 1 is displaced to the left and far from the food discharge opening 20. The cover 19 is connected by a snap connection with the supply drum 12. One part of the snap connection is provided in zones of four edges of the cover 19 with at least one projection 31 formed as a transversely extending ring, while the other part of the snap connection is provided with an associated recess 32 formed as a transversely extending groove, a slot and the like in associated edge zones of the upper end side 18 of the supply drum 12. The projection 31 form-lockingly snap in the recesses 32. It is therefore possible to remove the supply drum 12 with the form-lockingly held cover 19, as a closed unit from the housing 10 for example for post-filling of food. The removed supply drum 12 with the cover 19 can be again filled for example far from the aquarium. For this purpose, the cover 19 is removed from the supply drum 12 so as to release the end side 18 of the supply drum 12 for filling the food.

The upper side wall 13 of the supply drum 12 has a slider 35 between two drop strips 33 and 34. In order to completely close the food discharge opening 20 it is displaced in FIG. 1 completely to the right to the bottom 17. The slider 35 has a downwardly extending projection 36 in the left end region in FIG. 1. It engages in depressions of a ribbing 37 on the upper side of the side wall 13 in each displacement position in a form-locking manner. In this way the corresponding displacement position of the slider 35 is form-lockingly secured.

Figure 4:
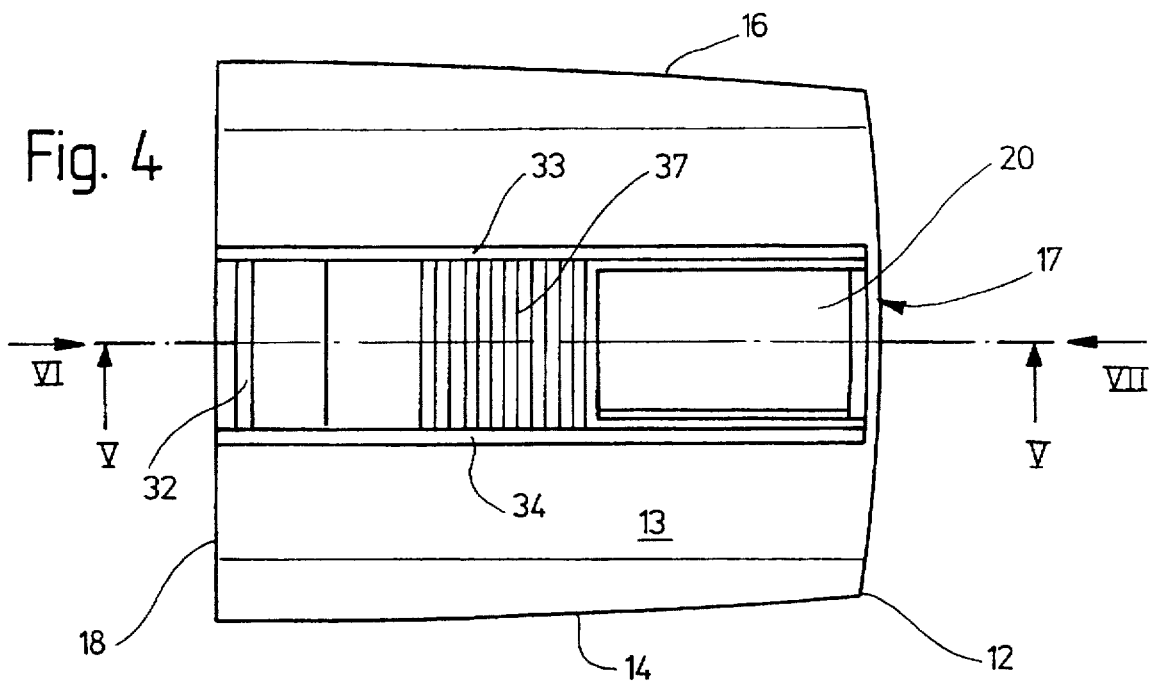
FIG. 4 is a plan view of a supply drum with a removed cover of the inventive feeding apparatus.

When the food discharge opening 20 is closed by the slider 35 and the removed cover 19 of the supply drum 12 is filled with the new food, the cover 19 is placed on the left open end side 18 as shown in FIGS. 4 and 5 and the supply drum 12 is snapped. The projection 31 form-lockingly snaps in the associated recess 32. The complete unit including the supply drum 12 and the cover 19 is then mounted on the housing 10. The removal of the supply drum 12 and the filling with the new food is performed in this way in a simple manner. It is advantageous since there is no danger that the residual food located in the supply drum 12 falls out of it and can contaminate the aquarium or the environment.

The cover 19 is provided with openings 38 for the air passage to the interior of the supply drum 12. The openings 28 are located in the central region of the cover 19. These openings can be formed for example as wall passages in the cover wall 39.

The supply drum 12 together with the cover 19 is held on a hollow shaft 40 of the housing 10. The hollow shaft 40 is provided with at least one throughgoing passage 41 for the air flow. In this way, the outer air can flow in accordance with the arrow 24 through the opening 23 into the interior of the housing 10 and there through the passage 21 of the hollow shaft 40 to the cover 19, and through the opening 38 and the cover wall 19 into the interior of the supply drum 12. This is shown in FIG. 1 with arrows 42.

The cover 19 is connected by a releasable snap connection with the hollow shaft 40. One part of the snap connection for example the cover 19 is provided with at least one projection 43 formed as a transversely extending rib. The other part of the snap connection for example the hollow shaft 4 is provided with at least one associated recess 44 formed as a transversely extending groove, a corresponding slot and the like.

The cover 19 has a sleeve 45 in its central region. The cover 19 is placed with the sleeve 45 on an end 46 of the hollow shaft 40. Flat driver surfaces 47 and 48 are provided correspondingly on the ends of the hollow shaft 40 on the one hand and the sleeve 45 on the other hand. When the cover 19 is displaced, they operate as drivers.

The drive device 22 operates a transmission 49 through the electric drive motor 27 which is switchable in intervals. The transmission 49 is formed as a two-stage screw transmission and its output is provided through a shaft 50 which is non-rotatably connected with the hollow shaft 40. For example, it is pressed in a sleeve 51 of the hollow shaft 40.

It will be understood that each of the elements described above, or two or more together, may also find a useful application in other types of constructions differing from the types described above.

While the invention has been illustrated and described as embodied in an automatic feeding apparatus, particularly for an aquarium, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An automatic feeding apparatus for an aquarium, comprising a housing; a supply drum rotatably supported in said housing and provided with a food discharge opening; a drive device arranged in said housing for driving said supply drum, said housing having an opening which is spaced from said food discharge opening and through which outer air is supplied, said drive device having a blower and operating so that the outer air is supplied into an interior of said housing and then into said supply drum and through said supply drum to said food discharge opening so that when said blower is immovable moist air rising in a region of said supply drum near said food discharge opening produces an underpressure in a region of said food discharge opening so that the outer air is aspirated into the housing, through said supply drum and out said food discharge opening, while when said blower is actuated the outer air is blown by an inner overpressure produced by said blower in the same direction through said supply drum out of said food discharge opening to operate as a blocking air stream.

2. An automatic feeding apparatus as defined in claim 1, wherein said blower, said supply drum and said drive device are formed so that when said blower is immovable said supply drum is also immovable.

3. An automatic feeding apparatus as defined in claim 2, wherein when said blower and said supply drum are immovable, said food discharge opening faces away from a downwardly located feeding point and is located above the feeding point.

4. An automatic feeding apparatus as defined in claim 1, wherein when said blower is actuated, said supply drum with said food discharge opening is rotated by said drive device between a food blocking position and a food releasing position.

5. An automatic feeding apparatus as defined in claim 4, wherein said drive device is formed so that said supply drum is rotatable in intervals between said food blocking position in which said food discharge opening is located above and said food releasing position in which said discharge opening is located below to face said feeding point.

6. An automatic feeding apparatus as defined in claim 1, wherein said blower together with said supply drum is actuated by said drive device.

7. An automatic feeding apparatus as defined in claim 1, wherein said blower has an impeller, said drive device having an electric drive motor which drives said impeller.

8. An automatic feeding apparatus as defined in claim 7, wherein said impeller is formed as a radial impeller.

9. An automatic feeding apparatus as defined in claim 1, wherein said housing has a further opening located far from said food discharge opening in the region of said blower.

10. An automatic feeding apparatus as defined in claim 9, wherein said blower has an impeller, said further opening being located in the region of said impeller.

11. An automatic feeding apparatus as defined in claim 1, wherein said drive device has a rotary axis for driving said supply drum, said supply drum having a drum axis, said rotary axis being inclined relative to said drum axis.

12. An automatic feeding apparatus as defined in claim 11, wherein said drive axis is inclined relative to said drum axis by substantially 2°.

13. An automatic feeding apparatus as defined in claim 4, wherein said drive device is formed so that said supply drum starting from a horizontal course in said food blocking position during a rotary action performs a wobbling movement to said food releasing position, so that the food has a forward inclination moving to said food discharge opening.

14. An automatic feeding apparatus as defined in claim 13, wherein said supply drum during the wobbling movement between said food blocking position and said food releasing position is turned over substantially 100°.

15. An automatic feeding apparatus as defined in claim 1, wherein said supply drum is formed as a substantially lying bucket having a closed bottom and has closed side walls with said food discharge opening provided in one of said side walls, said bucket having an open end side; and further comprising a releasable cover which closes said open end side of said bucket, said supply drum with said cover facing said housing and being supported and driven in a region of said housing.

16. An automatic feeding apparatus as defined in claim 15, wherein said cover is provided with openings through which air passes into an interior of said supply drum.

17. An automatic feeding apparatus as defined in claim 16, wherein said cover has a central region, said openings being provided in said central region of said housing.

18. An automatic feeding apparatus as defined in claim 16, wherein said cover has a cover wall, said openings being formed as throughgoing passages in said cover wall.

19. An automatic feeding apparatus as defined in claim 1, wherein said housing is provided with a hollow shaft, said supply drum being held on said hollow shaft, said hollow shaft having at least one axially extending passage through which air passes.

20. An automatic feeding apparatus as defined in claim 15, wherein said housing has a hollow shaft which supports said supply drum; and further comprising a releasable connection which connects said cover with said hollow shaft.

21. An automatic feeding apparatus as defined in claim 20, wherein said releasable connection has a connection formed as a transversely extending rib and provided on at least one of said cover and said hollow shaft, and an at least one associated recess provided on another of said cover and said hollow shaft and in which said projection engages.

22. An automatic feeding apparatus as defined in claim 21, wherein said recess is formed as a transversely extending groove.

23. An automatic feeding apparatus as defined in claim 21, wherein said recess is formed as a transversely extending slot.

24. An automatic feeding apparatus as defined in claim 15, wherein said housing has a hollow shaft which supports said supply drum, said cover having a central region provided with a sleeve and formed so that said cover is displaceable with said sleeve on an end of said hollow shaft.

25. An automatic feeding apparatus as defined in claim 24, wherein said end of said hollow shaft and said sleeve are provided with flat driver surfaces for operation as drivers when said cover is displaced.

26. An automatic feeding apparatus as defined in claim 15; and further comprising a snap connection connecting said supply drum with said cover.

27. An automatic feeding apparatus as defined in claim 26, wherein said snap connection has at least one projection formed as a transversely extending rib and provided in an edge zone of at least one of said cover and said supply drum, and at least one associated recess which is provided in an edge zone of another of said cover and said supply drum and in which said at least one projection engages.

28. An automatic feeding apparatus as defined in claim 27, wherein said at least one recess is formed as a transversely extending groove.

29. An automatic feeding apparatus as defined in claim 27, wherein said at least one recess is formed as a transversely extending slot.

30. An automatic feeding apparatus as defined in claim 1, wherein said housing has a hollow shaft supporting said supply drum, said drum device including an electric drive motor which is switchable in intervals and having a transmission with an output formed by a shaft which is non-rotatably connected with said hollow shaft.

31. An automatic feeding apparatus as defined in claim 30, wherein said transmission is formed as a two-stage screw transmission.

32. An automatic feeding apparatus as defined in claim 30, wherein said shaft is located in said hollow shaft.

* * * * *